Patented June 21, 1938

2,121,029

UNITED STATES PATENT OFFICE 2,121,029

GERMICIDES AND PROCESSES FOR MAKING THE SAME

Paul Goedrich, Fanwood, N. J., assignor to William R. Warner & Co., Inc., New York, N. Y., a corporation of Delaware No Drawing. Application December 15, 1934,
Serial No. 757,611

11 Claims. (Cl. 167—70)

This invention relates to the production of germicidal products comprising natural "conjugated" or "paired" bile acids and iodine. More specifically, the object of this invention is the production of such compounds of glycocholic and/or taurocholic acids.

It has been known that these bile acids in themselves possess considerable antiseptic power.

I have now found that combinations of the glycocholic and taurocholic acids with iodine can be produced which possess a very high degree of germicidal power. Indeed, it has been found by me that such compounds prepared according to the manner as will further appear herein, have a germicidal strength beyond other known compounds or preparations of iodine such as Lugol's solution, the tinctures of iodine of the pharmacopoeias, suspensoids, etc. Indeed, the germicidal strength has been found to be beyond that of such preparations with the same comparable iodine content.

These compounds should not be confused with the cholalic acid compounds of Mylius (Berichte der Deutschen Chemischen Gesellschaft, v. 20, pp. 683-88, 1887) and Kuester (Z. Phys. Chem. v. 16, p. 156, 1895). The products obtained by these investigators are quite different from the subject matter of the instant application both in chemical and physical properties.

Clinical and pharmacological experiments with my new iodine compounds have also shown that they are much less irritating than the class of iodine compounds of the type of Lugol's solution, tinctures, and suspensoids, and that they therefore represent a group of materials which possess many advantages over the known iodine preparations. Whether these results are due to synergistic interaction between the bile acids mentioned and the iodine component cannot be definitely stated, but something of this sort seems to be indicated by the comparative results obtained.

These new iodine compounds of glycocholic and taurocholic acids which I have prepared may be adapted, for practical general medicinal use, either in the form of a dry powder, solutions or pastes of practically any desired strength, depending upon the particular therapeutic requirements.

The dry preparations made in accordance with my specifications have their iodine component firmly held either by substitution and/or by adsorption. At any rate no free titratable iodine is shown upon the addition of pure substantially anhydrous ether, which would dissolve out any free iodine present, although the other components themselves are insoluble in that medium.

The "iodo-glycocholic" acid adsorption product may be formed by dissolving pure glycocholic acid in absolute alcohol and adding iodine to the solution in excess of the stoichiometric proportions required for producing the halogen substituted acid. This "acid" is then precipitated by water or ether in the form of a brown powder. It is soluble in alcohol and carbon disulfide, but insoluble in water or ether.

The "iodo-taurocholic" acid is formed by similarly dissolving pure taurocholic acid and iodine in alcohol or carbon disulfide, and then evaporating the solvent. It is in the form of a brown powder soluble in water and alcohol, but insoluble in ether.

I have found that an aqueous solution of my "iodo-taurocholic" acid iodine adsorption product is a solvent for the otherwise water-insoluble "iodo-glycocholic" acid adsorption product, and thus also that a mixture of these two iodine preparations is also water-soluble.

The pure glycocholic and taurocholic acids, exemplified in the foregoing description, are expensive preparations and are, therefore, under existing market conditions, more of laboratory interest than of immediate practical commercial value for the production of my products.

In the continuation of my research, I found that commercial, dried extract of ox-gall (so-called "sodium choleate") of the market will lend itself satisfactorily enough to the purpose of my invention, since the bile acids with which I am concerned are the major constituents thereof. These acids are present, in this commercially available ox-gall extract, in the form of their sodium salts, but I have found that this does not interfere in any way with the orderly development of my process, and it is, therefore, quite feasible to utilize these acids (in the form of their sodium salts) as found in this cheaper material.

However, this extract of ox-gall, as found on the market, contains also a number of impurities which it may be desirable to remove. The more objectionable impurities which may be removed with advantage consist principally of sodium chloride, albumin, calcium salts, etc. The relatively smaller quantities of native fatty substances, such as cholesterin, lecithin, and the like, which are also contained in the ox-gall extract, are not quantitatively nor qualitatively objectionable for the practical development of my product, and need not necessarily be removed unless it be deemed desirable to do so for special reasons.

In my practical work, when I have used ox-gall extract for the production of my new iodine preparations, I have purified it by the method described hereinafter which has been found generally satisfactory.

The ox-gall is diluted with absolute alcohol and allowed to stand for about 12 hours. The insoluble residue is removed by filtration, and the solution containing the bile salts is distilled to recover the alcohol. The resulting dry powder is non-hygroscopic and generally sufficiently pure for use in the preparation of my new iodine compounds of satisfactory quality.

It will be evident from the foregoing that I can also utilize the crude extract of ox-gall in the initial steps of my process, without necessarily effecting its utility and efficiency for the general purposes of this invention. However, it will also be obvious that the degree of purity and fine quality of the end product will depend upon the degree of refinement to which the crude primary material is subjected.

My iodized ox-gall products may be prepared by adding powdered iodine to a strong solution of ox-gall extracts in distilled water. After this mixture is allowed to stand for several days at room temperature, a dark brown mass is formed which will dissolve, when stirred, and will give a clear, dark brown solution. This clear brown solution will not precipitate iodine by further dilution with water or alcohol. If the ox-gall extract is dissolved in alcohol in the first place, a clear solution will be obtained as soon as the iodine is added, and the iodized solution can then be mixed with water in all proportions without any precipitation of the iodine. Also, the iodized extract of ox-gall may be prepared by combining the dried extract with powdered iodine, dissolving both components in a solvent such as alcohol or carbon disulfide, and removing the solvent by evaporation. The resulting brown powder will dissolve readily in water.

It appears that the germicidal action of these iodine adsorption compounds depend largely upon the amount of the adsorbed iodine present in the end products, but considerable latitude may be given to the amount of iodine actually employed in their preparation, depending upon the desired strength of the end-products, it being necessary, however, that the quantity of iodine shall be considerably in excess of the amount required for the stoichiometric saturation of the bile-acid material employed.

On the average it has been found that about 1.7 parts iodine will be sufficient to chemically saturate about 15 parts of the paired acids in the form in which they are found in the ox-gall extract, and that the iodo-acids thus formed will then take up considerably additional quantities of iodine by adsorption, even as much as equal parts, and thus about 18 to 19 parts of iodine to 15 parts of the ox-gall extract will be sufficient to produce a fully iodine-saturated and fully iodine-adsorbed product.

It will be understood, of course, that the quantitative relationship between the ox-gall and the iodine will also depend somewhat upon the degree of purity of the ox-gall extract, and the variation within limits of the inherent composition of the ox-gall extract in itself.

As previously mentioned, these iodine compounds contain their halide partly in combined and partly in adsorbed form. It has been found that the treatment of the dried ox-gall, whether purified or not, with halogens for a sufficiently long time, results in a halogenation of the ox-gall. Such action is accelerated by the application of moderate heat. It is also possible, then, with this halogen-substituted ox-gall to form halogen addition products if more iodine is added in excess of the amount required for partial or full substitution.

The iodine compounds prepared with this completely substituted ox-gall show a higher bactericidal power than those not prepared with the completely saturated ox-gall.

Convenient and preferred methods of preparing the compounds contemplated herein are set forth by way of illustration. Obviously, various of the several steps described may be modified as to quantitative relations, etc., within practical limits, without departing from the scope and spirit of the present invention.

Example 1.—1 part of glycocholic acid and 3 parts of taurocholic acid are mixed and diluted with 10 parts carbon disulfide. To this solution 2 parts iodine are added. The solvent is evaporated and the resulting dry powder is water soluble.

Example 2.—3 parts of dried ox-gall are dissolved in 20 parts water under heating. After cooling to normal temperature 1 part of iodine is added with constant stirring. The solution is then allowed to stand for several days at moderate temperature, being stirred repeatedly. Water is added to bring the solution to the desired percentage of iodine.

Example 3.—2 parts of alcohol-purified ox-gall are dissolved in 15 parts of 95% alcohol and 1 part of iodine added. As soon as the ox-gall is completely dissolved, water or alcohol is added to bring the solution to the desired percentage of iodine.

Example 4.—1 part of dried ox-gall, purified by solution in alcohol and precipitation in ether, is dissolved in 4 parts of carbon disulfide. To this solution 1 part of iodine is added and the solvent removed by evaporation. The resulting brown powder is soluble in water and in alcohol.

Example 5.—6 parts of crude ox-gall are ground in a mortar or pebble mill together with 1 part of iodine. The resulting brown powder is dissolved in water or alcohol to the desired percentage of iodine.

The material when obtained in the form of brown powder as described above may be dissolved in water or in alcohol to produce extemporaneous or stock solutions of any desired strength.

What I claim is:

1. Germicidal products comprising natural paired bile acids having iodine chemically combined therewith.

2. Germicidal products comprising natural paired bile acids having iodine combined therewith partly by chemical substitution and partly by adsorption.

3. Germicidal products comprising a solution of glycocholic acid in a solution of taurocholic acid, the said acids having iodine chemically combined therewith.

4. A composition of matter comprising the chemical and physical reaction product of iodine and glycocholic acid being in the form of a fine, amorphous, slightly hygroscopic, dark brown powder, and being soluble in alcohol and carbon disulfide and insoluble in water or ether.

5. A composition of matter comprising the chemical and physical reaction product of iodine and taurocholic acid being in the form of a fine, amorphous, slightly hygroscopic, dark brown powder, and being soluble in water and alcohol but insoluble in ether.

6. In a process for preparing germicidal compounds of natural paired bile acids and iodine, the steps which comprise adding measured quantities of powdered iodine to a strong solution of extract of ox-gall in distilled water, and permitting the mixture to stand until the iodine has completely interacted with the bile acids in process.

7. A process for producing aqueous solutions of germicidal compounds of natural paired bile acids and their salts with iodine, comprising the steps of preparing an aqueous solution of taurocholic acid, dissolving glycocholic acid in said solution, and adding iodine to the mixed solution.

8. Germicidal products comprising the alkali metal-salts of the natural "paired" bile acid having iodine chemically combined therewith.

9. Germicidal products comprising the alkali metal-salts of the natural "paired" bile acid having iodine combined therewith, partly by chemical substitution and partly by adsorption.

10. Germicidal products comprising the sodium salts of the natural "paired" bile acid having iodine chemically combined therewith.

11. Germicidal products comprising the sodium salts of the natural "paired" bile acid having iodine combined therewith, partly by chemical substitution and partly by adsorption.

PAUL GOEDRICH.